Figure 1:
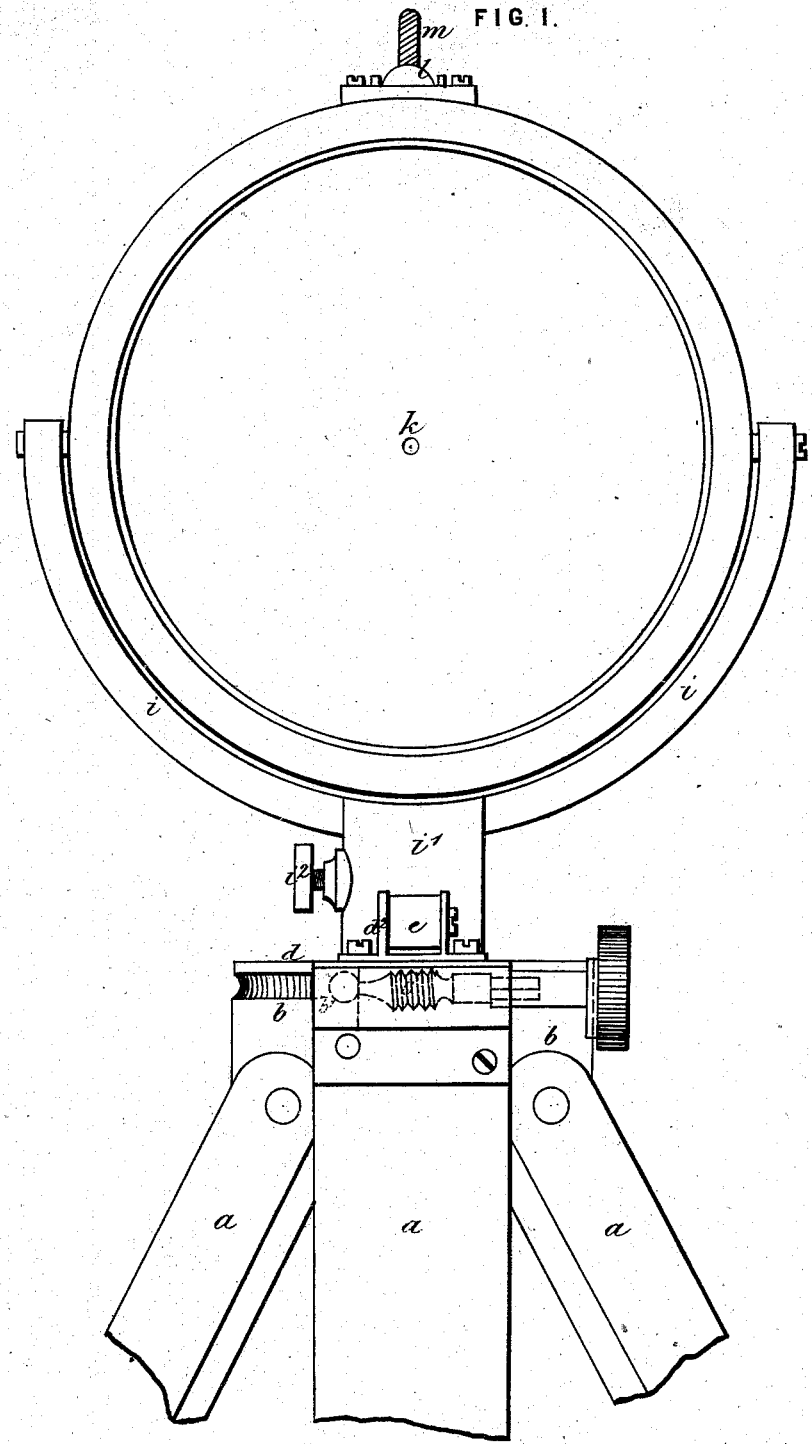

H. C. MANCE.
APPARATUS FOR SIGNALING BY MEANS OF REFLECTED LIGHT.

No. 186,427. Patented Jan. 23, 1877.

H. C. MANCE.
APPARATUS FOR SIGNALING BY MEANS OF REFLECTED LIGHT.
No. 186,427. Patented Jan. 23, 1877.
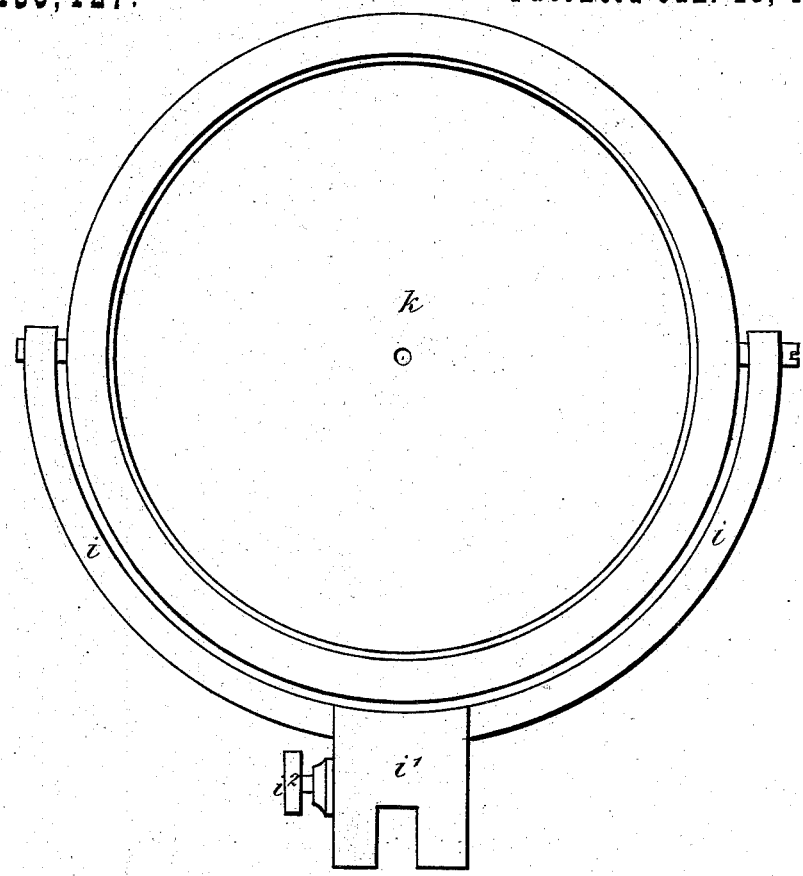
FIG. 7.
FIG. 13.
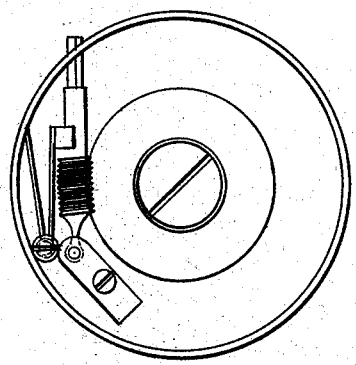
FIG. 12.
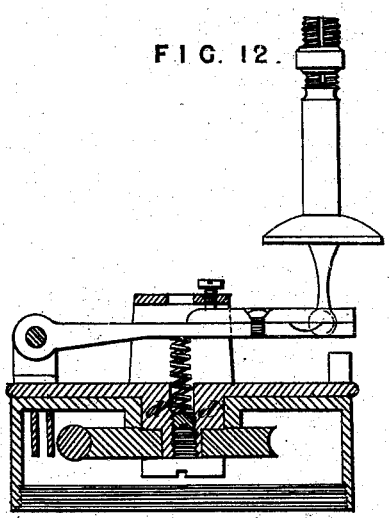

H. C. MANCE.
APPARATUS FOR SIGNALING BY MEANS OF REFLECTED LIGHT.
No. 186,427.                    Patented Jan. 23, 1877.
FIG. 11.
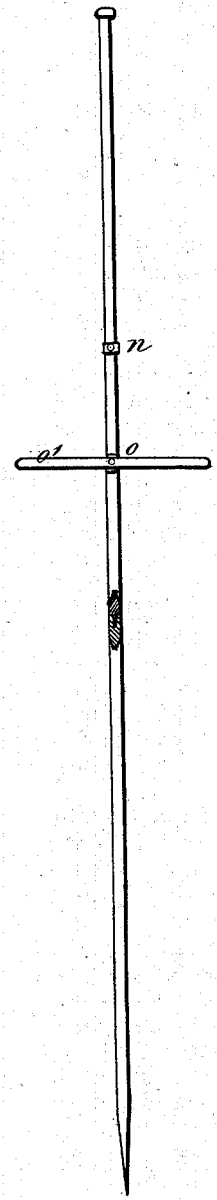
FIG. 9.  FIG. 10.
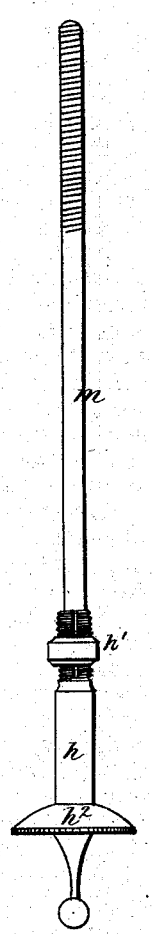 
FIG. 8.
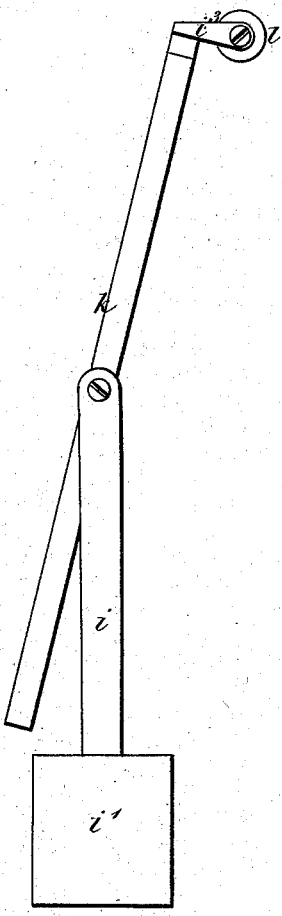

UNITED STATES PATENT OFFICE.

HENRY C. MANCE, OF KURRACHEE, BOMBAY, ASSIGNOR OF ONE-HALF HIS RIGHT TO SAMUEL GOODE, OF LONDON, ENGLAND.

IMPROVEMENT IN APPARATUS FOR SIGNALING BY MEANS OF REFLECTED LIGHT.

Specification forming part of Letters Patent No. 186,427, dated January 23, 1877; application filed February 25, 1876.

*To all whom it may concern:*

Be it known that I, HENRY CHRISTOPHER MANCE, of Kurrachee, Bombay, have invented Improvements in Apparatus for Telegraphing by Means of Reflected Light, of which the following is a specification:

This invention has for its object improvements in apparatus for telegraphing by means of reflected light.

I arrange a mirror in such a manner that I am able to reflect flashes of sunlight with such ease, quickness, precision, and accuracy, both as regards direction and duration, as to afford a ready means of communication between stations, however remote, (providing the rotundity of the earth or other obstacle does not intervene.)

The apparatus is specially adapted for use between changing positions, and, therefore, for military purposes in the field. The apparatus permits of the use of the Morse alphabet, which, as the best code of signals extant, is usually employed.

The instrument is constructed as follows: A circular mirror is supported on pivots in a semicircular frame, at the bottom of which is a socket. The latter is furnished with a thumb-screw to secure the mirror and frame when placed on a cone, forming part of a base-plate, which is able to turn on a brass bed. The bed serves to support the base-plate and mirror, and forms the stand of the instrument, tripod-legs being attached to it. The mirror and frame can be removed with ease from the cone by loosening the screw, so as to permit of their being packed separately. The base-plate revolves easily in the bed on which it rests, and it can be turned by means of a tangent-screw, which acts upon the milled edge of the base-plate, the circumference of which is grooved and cut to receive the threads of the tangent-screw. This screw when the head is pressed outward is removed from contact with the base-plate, which can then be turned round freely and rapidly by the hand. The branch which supports the tangent-screw is permanently screwed to the side of the bed.

In addition to the mirror-frame the base-plate carries a lever, with the outer end of which a handle is connected. The handle is upon a rod connected at one end with the lever and at the other with the mirror by joints. The lever is kept permanently raised by a spring as far as an adjustable stop will permit. By pressing the handle, it will be seen that the angle at which the mirror is inclined is slightly altered; the rod connecting the lever and mirror is telescopic, and can be clamped at any length by a screw, or the effective length of the rod can be altered more slowly by twisting the handle, and thus screwing the end of the rod through a metal ball, which works on pivots, and secures the rod to the back edge of the mirror. In signaling, the handle is worked like an ordinary telegraph-key by the right hand of the operator, the left hand being at liberty to control the tangent-screw. By means of these adjustments the angle of the mirror may be altered in accordance with the changing position of the sun without any interruption to the transmission of signals.

The upper extremities of the tripod-legs fit closely into cylindrical grooves cut into the under side of the brass bed. The legs are attached to the brass bed, and can be clamped fast by means of screws which pass through the bed, and are secured by nuts from the other side. These nuts are countersunk in the upper surface of the bed, so as not to interfere with the movement of the base-plate, which rests closely on the surface of the bed.

The instrument is used in connection with a sighting-rod. The rod is placed ten or twelve yards in advance of the instrument to mark a spot exactly in a line between the center of the mirror and the distant station; it should be made from white wood, and may be jointed like a fishing-rod. A metal stud slides along the stick, and marks the true line to the distant station. There is a light cross-piece about nine inches in length; also, adjustable, and usually about nine inches below the stud. This cross-piece is to serve as a mark on which to throw the beam of light in setting the instrument. For convenience in packing, the cross-piece can be turned parallel with the sighting-rod. A small quantity of the quicksilver is removed from the center of the mirror, leaving a space of clear glass about one-fourth of an inch in diameter, and a hole is cut in the metal at the back of the glass to allow of the operator looking through the clear glass from behind the mirror toward the distant station when adjusting the sighting-stick.

In order that my said invention may be most fully understood and readily carried into effect, I will proceed to describe the drawings hereunto annexed.

Figure 2:
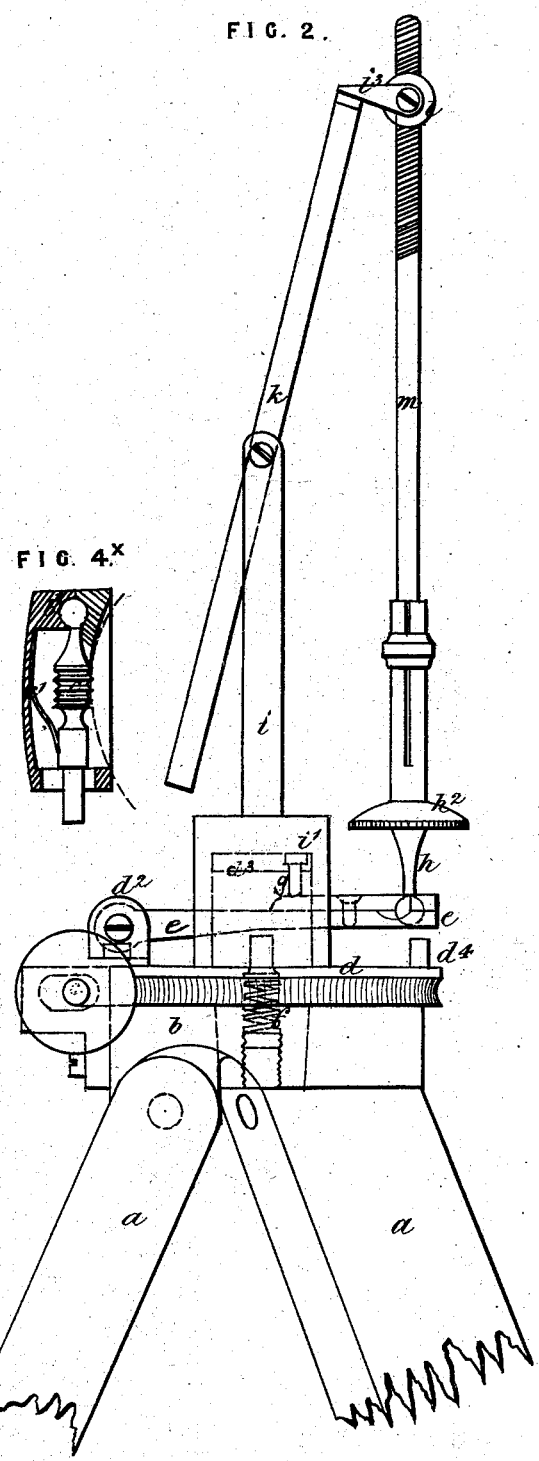

Fig. 1 is a front elevation, and Fig. 2 a side elevation, of the apparatus.

Figure 3:
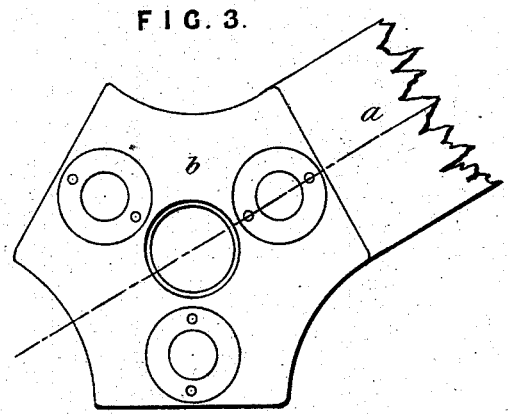
Figure 6:
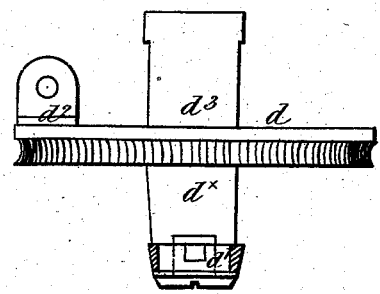
Figure 4:
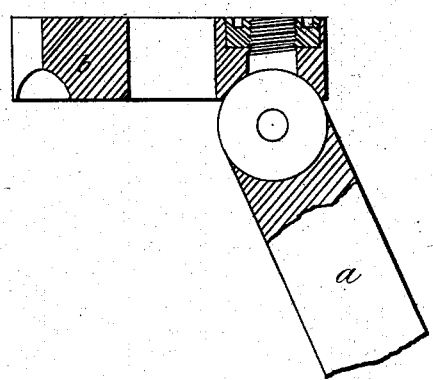
Figure 5:
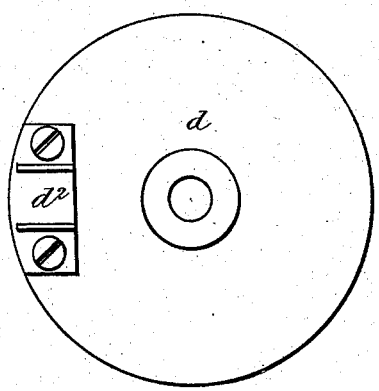

$a\ a$ are the tripod-legs. (The upper portions only are shown.) They fit into semi-cylindrical recesses in the under side of the brass bed $b$. They are attached, and can be clamped with any desirable degree of tightness by screws and nuts, as is shown at Figs. 3 and 4, which represent, respectively, a plan and section of the bed $b$, with the parts attached to it, as above stated. Formed with, or attached to, the bed $b$, is a branch, (shown separately in section at Fig. $4^{\times}$,) in which is formed the socket-bearing $b'$, to hold a ball formed on the end of the tangent-screw $c$. The tangent-screw may either be provided with a milled head, or its stem may be squared at the end to receive a separate key or handle. In the center of the bed $b$ is a cylindrical or somewhat conical hole, into which is accurately fitted a corresponding cylinder or cone, $d^{\times}$, formed on the under side of the base-plate $d$. A plan and a side view of the base-plate are shown at Figs. 5 and 6. The base-plate $d$ is held down in its place upon the bed by a screw and washer, $d^1$, but it is able to turn freely and steadily.

Worm-teeth are cut around the edge of the base-plate, as is shown, and with these the thread of the worm or tangent-screw $c$ engages, the screw being pressed into contact with the base-plate by the spring $c'$; but the screw can, by a slight pressure, be pushed back out of gear, to admit, when desired, of the base-plate being turned rapidly by hand. $d^2$ is a lump, formed or fixed on the base-plate $d$. The lever $e$ is jointed to it. The lever passes through a slot or hole in the cone $d^3$, which rises in the center of the base-plate. $f$ is a spring, which sustains the lever $e$; but it can be depressed at pleasure, its play being limited by the stud $d^4$, fixed beneath it in the base-plate, and the adjusting-screw $g$, the lower end of which forms a stop, limiting the rise of the lever. To the outer end of the lever $e$ the lower part $h$ of a telescopic connecting-rod is attached by a ball-and-socket or other suitable joint.

The cone $d^3$ in the center of the base-plate receives, when the instrument is mounted for use, the socket $i^1$ of the mirror-frame $i$, in which is hung in trunnions the silvered glass mirror $k$. A front and side view of the mirror-frame and mirror are shown at Figs. 7 and 8. The mirror shown is circular, but it may be square, or of any other form. $i^2$ is a screw, for clamping the mirror-frame in its place. When it is screwed home its end enters a groove provided for it in the cone $d^3$. The mirror and mirror-frame are removed and packed in a separate case for conveyance from place to place. To the top of the mirror-frame the nut $l$ is attached. The nut is formed with trunnions or studs projecting from it on either side, and these are held (but so as to be able to turn) by the arms $i^3$, projecting from the mirror-frame; or, the nut may be held between the points of pivot-screws. The upper part $m$ of the telescopic connecting-rod has a screw-thread cut upon it, and it works through the nut $l$.

Figs. 9 and 10 show a side view and section of the telescopic connecting-rod. The lower part $h$ is tubular, and the stem $m$ enters into it, and is clamped in any position by screwing the nut $h^1$ down the thread on which it works. This screw is taper, and there are slits in the tube so that the nut is able to compress and contract it, so as to bind the stem $m$; or, any other simple clamping device—for example, a simple slider—may be resorted to. $h^2$ is a milled head, which, with other parts connected with it, serves as a finger-key or its equivalent. The fingers rest upon it to depress the lever $e$, and as soon as the pressure is relieved the spring causes it to return, the mirror moving with it. The milled head is also used to turn the connecting rod, to vary the inclination of the mirror.

Fig. 11 shows, to a smaller scale, the sighting-rod. It is made in two parts, and has upon it two sliders, $n$ and $o$. The slider $n$ is to be aligned with the station to which the signal is to be made, the operator looking through the sighting-hole in the back of the mirror. The slider $o$ carries a cross-bar, $o'$, to receive the reflection from the mirror.

In preparing the apparatus for use, it is so adjusted that the light appears on the center of the cross-bar $o'$, when the finger-key $h^2$ is not depressed, and so that the depression of the finger-key will raise the reflection to the sight-point $n$, and so render it visible to the station to which the signals are to be made.

During signaling, the adjustment is maintained by slowly rotating the milled head $h^2$ and the tangent-screw $c$. This can be done without any interruption of the signals.

The way in which the flashes are combined to communicate by the Morse code does not require further description.

In order to protect the instrument from rough usage, and to permit of its easy removal from, and use without, the tripod, a hollow cylinder or false bed may be screwed on the bed proper, as shown by Figs. 12 and 13. The upper end of this cylinder is pierced, to receive the under side cone $d^{\times}$, on which, and within the cylinder, is fixed a plate. The tangent-screw acts on the circumference of this plate, and revolves the base-plate and mirror. The tangent-screw and spring are also fixed inside the cylindrical false bed.

If it is preferred, in place of teeth on the edge of the base-plate, a circle of teeth may be cut on its under side, a worm or a pinion being made to engage with these teeth to rotate the base-plate. For a permanent signaling-station the instrument will be mounted on a fixed pedestal in place of on tripod-legs, and the size of the mirror may be increased.

The apparatus possesses the capability, even when stationary, of telegraphing with equal ease in every direction. When required to be used in the direction immediately opposite to the sun, it is supplemented by a second mirror. The sun's rays are, by the second mirror, reflected onto the mirror attached to the apparatus, and so to the required spot. The instrument is, however, especially adapted for use between changing positions, and therefore for military purposes in the field, surveying, &c. The alphabet usually employed is the Morse, but any other code may be used.

It is obvious that artificial light or moonlight may be used when the sun is not available. When, for any purpose, a heliostat is required, these instruments are available.

What I claim as my improvements in apparatus for telegraphing by means of reflected light, is—

The combination of a mirror with a finger-key or its equivalent, and with apparatus by which the mirror can be rotated and inclined, the whole being mounted on a suitable stand, and arranged in such a manner that, by the action of the finger-key or its equivalent, light can be flashed with precision to a distant station, substantially as described.

HENRY CHRISTOPHER MANCE.

Witnesses:
JNO. WILLIAMS,
 *Asst. Supt. Govt. Telegraphs,*
   *Kurrachee.*
FREDK. A. PATTEN,
 *Ag. Supt. Persian Gulf Telegraph.*